United States Patent
Lee et al.

(10) Patent No.: US 8,155,260 B2
(45) Date of Patent: Apr. 10, 2012

(54) NUCLEAR FUEL ROD FOR FAST REACTORS WITH OXIDE COATING LAYER ON INNER SURFACE OF CLADDING, AND MANUFACTURING METHOD THEREOF

(75) Inventors: Chan Bock Lee, Daejeon (KR); Jong-Hyuk Baek, Daejeon (KR); Byoung-Oon Lee, Daejeon (KR); Jin-Sik Cheon, Daejeon (KR); Ho Jin Ryu, Daejeon (KR); Jun Hwan Kim, Daejeon (KR); Sung Ho Kim, Daejeon (KR); Tae-Kyu Kim, Daejeon (KR); Woo-Gon Kim, Daejeon (KR); Chong-Tak Lee, Daejeon (KR); Ki-Hwan Kim, Daejeon (KR); Young-Mo Ko, Daejeon (KR); Yoon-Myeong Woo, Daejeon (KR); Seok-Jin Oh, Daejeon (KR); Dohee Hahn, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 453 days.

(21) Appl. No.: 12/110,775

(22) Filed: Apr. 28, 2008

(65) Prior Publication Data

US 2009/0141851 A1    Jun. 4, 2009

(30) Foreign Application Priority Data

Aug. 17, 2007  (KR) .................. 10-2007-0082795

(51) Int. Cl.
*G21C 3/00*  (2006.01)

(52) U.S. Cl. .............. 376/414; 376/416; 376/409
(58) Field of Classification Search .................. 376/414, 376/416, 417, 409
See application file for complete search history.

(56) References Cited

U.S. PATENT DOCUMENTS

| 4,032,400 | A | * | 6/1977 | Johnson et al. | 376/417 |
|---|---|---|---|---|---|
| 4,541,984 | A | * | 9/1985 | Palmer | 376/415 |
| 5,268,947 | A | * | 12/1993 | Bastide et al. | 376/422 |
| 5,377,246 | A | * | 12/1994 | Taylor et al. | 376/416 |

OTHER PUBLICATIONS

Zelenskii et al., "Methods for Protecting Fuel-Element Cladding from Corrosion in Lead Coolant and the Heat-Transfer Sublayer," Atomnaya Energiya, vol. 104, No. 2, pp. 88-94, Feb. 2008 (English language translation enclosed).*
R.G. Pahl, et al., Performance of HT9 Clad Metallic . . . , Journal of Nuclear Materials 204, pp. 141-147, 1993.
Takanari Ogata, et al., Reactions Between U-Zr Alloys . . . , Journal of Nuclear Materials 250, pp. 171-175, 1997.

* cited by examiner

*Primary Examiner* — Ricardo Palabrica
(74) *Attorney, Agent, or Firm* — Lucas & Mercanti, LLP

(57) ABSTRACT

Disclosed herein are a nuclear fuel rod for fast reactors, which includes an oxide coating layer formed on the inner surface of a cladding, and a manufacturing method thereof. The nuclear fuel rod for fast reactors, which includes the oxide coating layer formed on the inner surface of the cladding, can increase the maximum permissible burnup and maximum permissible temperature of the metallic fuel slug for fast reactors so as to prolong the its lifecycle in the fast reactors, thus increasing economic efficiency. Also, the fuel rod is manufactured in a simpler manner compared to the existing method, in which a metal liner is formed, and the disclosed method enables the cladding of the fuel rod to be manufactured in an easy and cost-effective way.

7 Claims, 1 Drawing Sheet

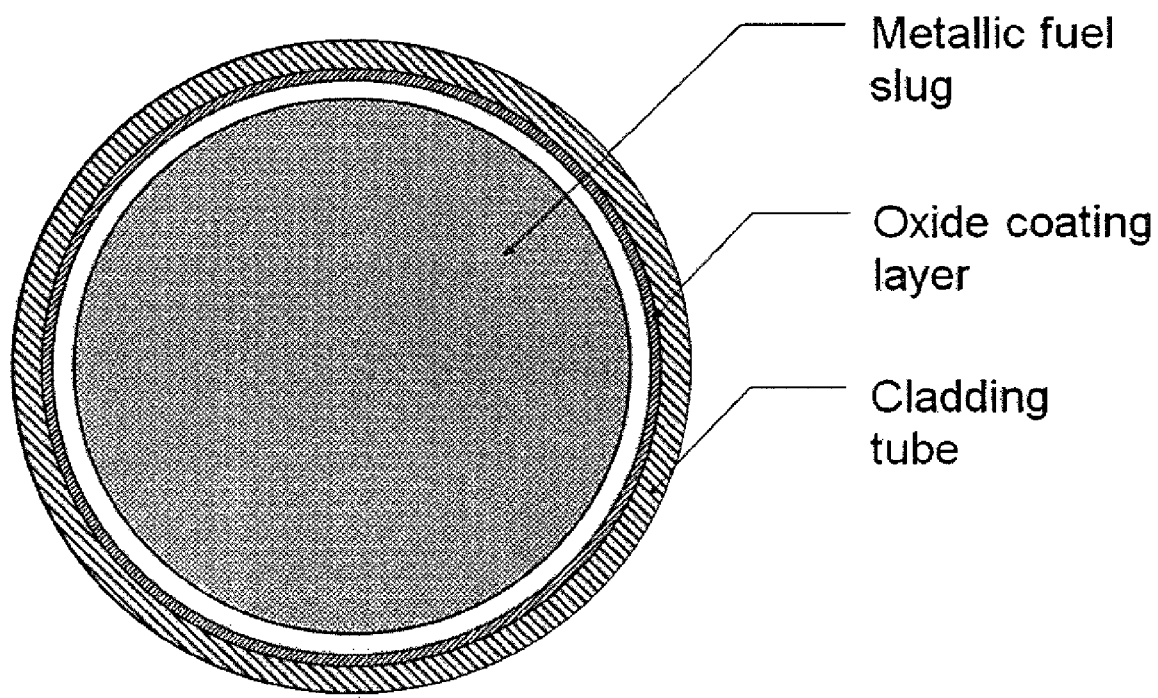

NUCLEAR FUEL ROD FOR FAST REACTORS WITH OXIDE COATING LAYER ON INNER SURFACE OF CLADDING, AND MANUFACTURING METHOD THEREOF

CROSS-REFERENCE TO RELATED APPLICATIONS

This patent application claims the benefit of priority from Korean Patent Application No. KR10-2007-0082795 filed on Aug. 17, 2007, the contents of which are incorporated herein by reference.

BACKGROUND OF THE INVENTION

1. Field of the Invention

The present invention relates to a nuclear fuel rod for fast reactors, which includes an oxide coating layer formed on the inner surface of cladding.

2. Description of the Prior Art

Nuclear fuel in fast reactors is designed in various types, including a metallic type, an oxide type, a nitride type and a carbide type, and the nuclear fuel rod includes fissionable fuel slug that undergoes a nuclear reaction. The fissionable fuel slug is sealed by a cladding tube, which is not reactive due to its good compatibility with coolant (e.g. liquid sodium in Sodium-cooled Fast Reactor) and has good heat transfer properties. The fuel rods are assembled at constant intervals to construct a fuel assembly and the assemblies are put into a nuclear reactor core. Herein, the cladding surrounding the nuclear fuel slug should serve to prevent direct contact between the nuclear fuel slug and the coolant, such that chemical interactions therebetween do not occur, and to prevent the leakage of fission products into the coolant. In addition, in fast reactors, in which metallic nuclear fuel is used, it is highly advantageous in terms of the safety and economic efficiency of nuclear fuel to suppress interactions between the cladding tube and the fissionable fuel slug.

Particularly, in fast reactors, in which metallic fuel is used, there occurs a phenomenon in which the constitutional elements (U, Pu, Th, MA, Zr, Mo, fission products, etc.) of a fissionable fuel slug and the constitutional elements (Fe, Cr, W, Mo, V, Nb, etc.) of stainless steel cladding tube can interact with each other by diffusion, leading to a decrease in the melting temperature of the metallic fuel slug and a decrease in the strength of the cladding. For this reason, the maximum permissible burnup and maximum permissible operating temperature can be limited [J. Nucl. Mater., 204 (1993) p. 244-251 and J. Nucl. Mater., 204 (1993) p. 141-147].

Also, a diffusion couple experiment, carried out by T. Ogata et al. at 923 K, demonstrated that the reaction between the metallic fuel slug and the cladding tube occurred due to mutual diffusion therebetween, and reported that the thickness of a layer resulting from the mutual reaction increased with an increase of the reaction time [J. Nucl. Mater., 250 (1997) p. 171-175].

In an attempt to prevent the mutual diffusion, General Electric (GE) suggested a technology for suppressing the mutual interaction between the metallic fuel slug and the cladding tube by inserting a liner or a sleeve about 50-μm thick between the metallic fuel slug and the cladding tube using one metal selected from among zirconium (Zr), titanium (Ti), niobium (Nb) and molybdenum (Mo).

The technology of GE has difficulties in that, because the introduction of additional processes is necessary, the production of the nuclear fuel rod becomes complicated, and in that significant additional costs are incurred.

Also, D. C. Crawford et al melted and cast a zirconium tube about 200 μm thick in order to remove quartz tube mold waste occurring during the fuel slug manufacturing process for fast reactors and, at the same time, to suppress fuel-cladding chemical interactions (FCCI) between the metallic fuel slug and the cladding tube, and reported the results of experiments carried out using the zirconium tube as a inner liner. However, there was a problem in that cracks occur in the zirconium tube.

Accordingly, the present inventors have invented a nuclear fuel rod for fast reactors, in which an oxide coating layer is formed on the inner surface of the stainless steel cladding tube in order to prevent or reduce the diffusion and interaction of elements between the stainless steel cladding tube and the nuclear fuel slug, and which is easily manufactured using the prior methods for manufacturing oxides.

SUMMARY OF THE INVENTION

It is an object of the present invention to provide a nuclear fuel rod for fast reactors, in which an oxide coating layer is formed on the inner surface of cladding in order to prevent the constitutional elements of the nuclear fissionable fuel slug from interacting with the constitutional elements of a cladding tube through their mutual diffusion.

Another object of the present invention is to provide a method for manufacturing said nuclear fuel rod for fast reactors, in which the oxide coating layer is formed on the inner surface of the cladding.

To achieve the above objects, the present invention provides a nuclear fuel rod for fast reactors, in which an oxide coating layer is formed on the inner surface of cladding, as well as a manufacturing method thereof.

The inventive nuclear fuel rod for fast reactors, which includes the oxide coating layer formed on the inner surface of the cladding tube, can increase the maximum permissible burnup and maximum permissible temperature of metallic nuclear fuel for fast reactors, thus prolonging the fuel lifecycle of the fast reactors and increasing its economic efficiency. Also, the inventive nuclear fuel rod can be manufactured in a simpler manner than to the prior methods, in which a metal liner is formed, and the inventive method enables the cladding of the nuclear fuel rod to be manufactured in an easy and cost-effective way, when comparing the prior ones.

BRIEF DESCRIPTION OF THE DRAWINGS

The above and other objects, features and advantages of the present invention will be more clearly understood from the following detailed description, taken in conjunction with the accompanying drawings, in which:

FIG. 1 is a schematic diagram of nuclear fuel rod for fast reactors, which includes an oxide coating layer.

DETAILED DESCRIPTION OF THE INVENTION

Hereinafter, the present invention will be described in detail.

The present invention provides a nuclear fuel rod for fast reactors, which includes an oxide coating layer formed on the inner surface of cladding.

The cladding of a nuclear fuel rod for typical fast reactors may generally be made of high-chromium stainless steel having a chromium content of 8-12 wt %. On the inner-surface of the high-chromium stainless steel cladding tube, the oxide coating layer according to the present invention is easily formed. The oxide coating layer consists of chromium oxide ($Cr_2O_3$), vanadium oxide ($V_2O_3$) or zirconium oxide ($ZrO_2$), which have low reactivity with the constitutional elements of the high-chromium stainless steel cladding tube and the constitutional elements of the metallic fuel slug. Furthermore, the oxides have a compact structure, and thus serve to prevent the constitutional elements (iron, chromium, tungsten, molybdenum, vanadium, niobium, etc.) of the cladding tube from interacting with those of the nuclear fuel slug by mutual diffusion.

The thickness of the oxide coating layer may be 0.1-100 μm. If the thickness of the oxide coating layer is greater than 100 μm, the transfer of heat, generated in the nuclear fuel slug, to the coolant, will be reduced, and if it is smaller than 0.1 μm, the interaction-preventing function of the oxide coating layer will be deteriorated.

In another aspect, the present invention provides a method for manufacturing a nuclear fuel rod for fast reactors, which comprises forming an oxide coating layer on the inner surface of the nuclear fuel cladding using any one method selected from the group consisting of oxidation in acid solution, high-temperature oxidation, electrolytic oxidation and vapor phase deposition.

In the oxidation in acid solution, nuclear fuel cladding, polished through mechanical or chemical polishing so as to have an inner surface roughness ($R_{max}$) of less than 1 μm, is dipped in nitric acid, citric acid, oxalic acid, sulfuric acid or perchloric acid according to ASTM standards so as to form an oxide coating layer on the inner surface thereof.

Also, the high-temperature oxidation for forming the oxide coating layer according to the present invention is a method in which nuclear fuel cladding, polished as described above with respect to the oxidation in acid solution, is heated in a vacuum, and oxygen is injected into a chamber containing the heated cladding, thus forming the oxide coating layer.

Herein, said vacuum may have a pressure of $1.0\times10^{-7}$ to $1.0\times10^{-4}$ torr. If the pressure is higher than $1.0\times10^{-4}$ torr, there is a problem in that an impurity-containing oxide coating layer can form due to the presence of air, when the cladding is heated at a pressure higher than $1.0\times10^{-4}$ torr. Also, the heating of the cladding can be carried out at a temperature of 400-600° C. If the heating temperature is higher than 600° C., there is a problem in that the production and growth of microstructures and precipitates, which adversely affect the basic properties of the cladding, occur, and if the heating temperature is lower than 400° C., there is a problem in that the production rate of chromium oxide layer on the surface of the fuel cladding is greatly reduced.

The oxygen can be injected at a partial pressure of $1.0\times10^{-5}$ to $1.0\times10^{-1}$ torr. If the oxygen partial pressure is more than $1.0\times10^{-1}$ torr, there is a problem in that the oxide coating layer on the surface is rapidly produced, thus producing iron oxide, and if the oxygen partial pressure is less than $1.0\times10^{-5}$ torr, the production of chromium oxide will be delayed.

Also, in the electrolytic oxidation for the oxide coating layer according to the present invention, the oxide coating layer can be formed on the cladding surface for fast reactor fuel rods by connecting a metal network, as a negative electrode, and the polished fuel cladding, and then applying electric current in an electrolyte solution.

Herein, the negative electrode may be made of platinum, iron or aluminum, and the current can be applied at a current ratio of 0.60-2.0 for a period ranging from 15 minutes to 5 hours. If the applied current ratio and time deviate from the above-specified range, there is a problem in that an oxide coating layer showing optimal properties is not formed. Also, if the applied time deviates from the above-specified range, there is a problem in that the thickness of the oxide coating layer deviates from the range of 1-100 μm.

Finally, the vapor deposition for forming the oxide coating layer according to the present invention comprises removing native oxide coating layers and organic substances from the cladding surface through argon ion sputtering and heating, and depositing chromium oxide, zirconium oxide or vanadium oxide on the cleaned cladding surface in a vacuum, thus forming the oxide coating layer.

Herein, the use of argon ion sputtering enables native oxide coating layers to be removed, such that an oxide coating layer having a good adherence can be formed through vapor deposition. When said heating is carried out at a temperature of 200-300° C., the organic substances and gases remaining on the surface of the fuel cladding for fast reactors can be removed, and the adherence between the oxide coating layer, formed through vapor deposition, and the fuel cladding can be improved.

Said vacuum enables the oxide coating layer to be formed at a pressure of $1.0\times10^{-8}$-$1.0\times10^{-6}$ torr. If the pressure level deviates from the above-specified range, there is a problem in that the integrity of the oxide coating layer is not hard.

Hereinafter, the present invention will be described in further detail with reference to examples. It is to be understood, however, that these examples are illustrative only, and the scope of the present invention is not limited thereto.

EXAMPLE 1

Manufacture 1 of Nuclear Fuel Rod for Fast Reactors, Which has Oxide Coating Layer Formed by Oxidation in Acid Solution A stainless steel (SS316L or SS316LN) or ferrite/martensite steel (ASTM Gr. 91 or ASTM Gr. 92) tube for prior nuclear fuel claddings for fast reactors was cut to a length of 100 mm to make a tube sample. Then, the inner surface of the tube was mechanically or chemically polished to have a roughness ($R_{max}$) of less than 1 μm.

The inner surface of the sample was dipped in a 45-55 vol % nitric acid solution using a specifically designed device at 54° C. for at least 30 minutes according to test procedures specified in ASTM standards (ASTM A967-01, ASTM A380-99, and ASTM B912-00). Then, the sample was washed with distilled water having an impurity concentration of less than 200 ppm, thus manufacturing a nuclear fuel rod for fast reactors having an oxide coating layer formed on the inner surface thereof.

EXAMPLE 2

Manufacture 2 of Nuclear Fuel Rod for Fast Reactors, Which has Oxide Coating Layer Formed by Oxidation in Acid Solution The procedure of Example 1 was repeated, except that the dipping process was carried out in a 49-60 vol % nitric acid solution at a temperature of 49-60° C. for at least 20 minutes.

EXAMPLE 3

Manufacture 3 of Nuclear Fuel Rod for Fast Reactors, Which has Oxide Coating Layer Formed by Oxidation in Acid Solution The procedure of Example 1 was repeated, except that the dipping process was carried out in a 20-45 vol % nitric acid solution at a temperature of 21-32° C. for at least 30 minutes.

EXAMPLE 4

Manufacture 4 of Nuclear Fuel Rod for Fast Reactors, Which has Oxide Coating Layer Formed by Oxidation in Acid Solution The procedure of Example 1 was repeated, except that the dipping process was carried out in a mixture solution of 49-60 vol % nitric acid solution and 2.5 wt % sodium bichromate solution at a temperature of 49-60° C. for at least 30 minutes.

EXAMPLE 5

Manufacture 5 of Nuclear Fuel Rod for Fast Reactors, Which has Oxide Coating Layer Formed by Oxidation in Acid Solution The procedure of Example 1 was repeated, except that the dipping process was carried out in a 4-10 wt % citric acid solution at a temperature of 60-71° C. for at least 4 minutes.

EXAMPLE 6

Manufacture 6 of Nuclear Fuel Rod for Fast Reactors, Which has Oxide Coating Layer Formed by Oxidation in Acid Solution The procedure of Example 1 was repeated, except that the dipping process was carried out in a 4-10 wt % citric acid solution at a temperature of 49-61° C. for at least 10 minutes.

EXAMPLE 7

Manufacture 7 of Nuclear Fuel Rod for Fast Reactors, Which has Oxide Coating Layer Formed by Oxidation in Acid Solution The procedure of Example 1 was repeated, except that the dipping process was carried out in a 4-10 wt % citric acid solution at a temperature of 21-49° C. for at least 20 minutes.

EXAMPLE 8

Manufacture 8 of Nuclear Fuel Rod for Fast Reactors, Which has Oxide Coating Layer Formed Thereon by High-temperature Oxidation A stainless steel (SS316L or SS316LN) or ferrite/martensite steel (ASTM Gr. 91 or ASTM Gr. 92) tube for prior nuclear fuel claddings for fast reactors was cut to a length of 100 mm to make a tube sample. Then, the inner surface of the tube was mechanically or chemically polished to have a roughness ($R_{max}$) of less than 1 μm.

The sample was placed in a high-vacuum chamber, which was then exhausted to a vacuum level of less than $1.0 \times 10^{-4}$ torr. Then, the sample in the chamber was heated to 500° C. at a rate of 15° C./min, and was then heated at 500° C. for 1 hour to remove impurities from the sample surface. Then, high-purity oxygen having a purity of more than 99.999% was injected into the chamber, and an oxide coating layer was formed on the sample at 500° C. for a period ranging from 30 minutes to 48 hours while maintaining an oxygen partial pressure of less than $1.0 \times 10^{-1}$ torr. Then, the sample was washed with distilled water having an impurity concentration of less than 200 ppm, thus manufacturing a nuclear fuel rod for fast reactors having an oxide coating layer formed thereon.

EXAMPLE 9

Manufacture 9 of Nuclear Fuel Rod for Fast Reactors, Which has Oxide Coating Layer Formed Thereon by Electrolyte Oxidation A stainless steel (SS316L or SS316LN) or ferrite/martensite steel (ASTM Gr. 91 or ASTM Gr. 92) tube for prior nuclear fuel claddings for fast reactors was cut to a length of 100 mm to make a tube sample. Then, the inner surface of the tube was mechanically or chemically polished to have a roughness ($R_{max}$) of less than 1 μm.

The sample was connected to a positive electrode, a platinum network was connected to a negative electrode, and the resulting structure was placed in an electrolyte, prepared by adding 5 g of potassium hydroxide and 8 g of water glass ($2Na_2.2SiO_3.H_2O$) to 1 l of water. Electric current was applied to the electrodes at a current ratio of 0.60-2.0 for a period ranging from 15 minutes to 5 hours. Then, the sample was washed with distilled water having an impurity concentration of less than 200 ppm, thus manufacturing a nuclear fuel rod for fast reactors having an oxide coating layer formed thereon.

EXAMPLE 10

Manufacture 10 of Nuclear Fuel Rod for Fast Reactors, Which has Oxide Coating Layer Formed Thereon by Vapor-phase Deposition A stainless steel (SS316L or SS316LN) or ferrite/martensite steel (ASTM Gr. 91 or ASTM Gr. 92) tube for prior nuclear fuel claddings for fast reactors was cut to a length of 100 mm to make a tube sample. Then, the inner surface of the tube was mechanically or chemically polished to attain a roughness ($R_{max}$) of less than 1 μm.

The sample was placed in a chamber, and the surface of the sample was ion-sputtered with high-purity argon in a vacuum of less than $1.0 \times 10^{-6}$ torr at 200-300° C. for 30 minutes. The sample, from which native oxides and organic substances had been removed by said ion sputtering, was deposited with chromium oxide, zirconium oxide or vanadium oxide, thus manufacturing a nuclear fuel rod for fast reactors, having an oxide coating layer formed thereon.

Diffusion Couple Experiment of Cladding Tube and Fissionable Fuel Slug

In order to evaluate mutual diffusion between the fuel cladding tube of Examples 1-10 and a fissionable fuel slug U-10Zr) for fast reactors, each of the nuclear fuel rods was cut to a length of 10 mm and divided in half in a diameter direction. Then, each of the coupling samples was subjected to a cladding-fuel diffusion coupling experiment at 740° C. for 25 hours. As a result, it was observed that, in the coupling samples of Examples 1-10, mutual diffusion between the cladding and the fissionable fuel slug was suppressed compared to samples having no oxide coating layer on the cladding surface, and the effect of the oxide coating layer increased with the increase in the thickness thereof.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A nuclear fuel rod for fast reactors comprising
a metallic nuclear fuel slug;
a nuclear cladding tube; and
an oxide coating layer on an inner surface of the nuclear cladding tube before fuel fission,
wherein the oxide coating layer is consisting essentially of any one selected from the group consisting of chromium oxide ($Cr_2O_3$), vanadium oxide ($V_2O_3$) and zirconium oxide ($ZrO_2$).

2. The nuclear fuel rod of claim 1, wherein the oxide coating layer has a thickness of 0.1-100 μm.

3. The nuclear fuel rod of claim 1, wherein the oxide coating layer is formed on the inner surface of the nuclear cladding tube by oxidation in an acid solution, high-temperature oxidation, electrolytic oxidation or vapor-phase deposition.

4. The nuclear fuel rod of claim 3, wherein the oxide coating layer is formed by the oxidation in an acid solution by steps comprising:
polishing an inner surface of the nuclear cladding tube by mechanical or chemical polishing;
dipping the polished nuclear cladding tube in an acid solution; and
wherein the acid is selected from the group consisting of nitric acid, citric acid, oxalic acid, sulfuric acid and perchloric acid.

5. The nuclear fuel rod of claim 3, wherein the oxide coating layer is formed on the inner surface of the nuclear cladding tube by the high-temperature oxidation by steps comprising:
polishing an inner surface of the nuclear cladding tube by mechanical or chemical polishing;
heating the polished nuclear cladding tube in a vacuum of $1.0\times10^{-7}$-$1.0\times10^{-4}$ torr at 400-600° C. in a chamber; and
injecting oxygen into the chamber, containing the nuclear fuel rod, to a pressure of $1.0\times10^{-5}$-$1.0\times10^{-1}$ torr.

6. The nuclear fuel rod of claim 3, wherein the oxide coating layer is formed on the inner surface of the nuclear cladding tube by the electrolyte oxidation by steps comprising:
polishing an inner surface of the nuclear cladding tube by mechanical or chemical polishing;
connecting the polished nuclear cladding tube to a metal network consisting of any one selected from the group consisting of platinum, gold, iron and aluminum, and
applying electric current to the electric circuit in an electrolyte solution at a current ratio of 0.60-2.0 for 15 minutes to 5 hours.

7. The nuclear fuel rod of claim 3, wherein the oxide coating layer is formed on the inner surface of the nuclear cladding tube by the vapor-phase deposition by steps comprising:
polishing an inner surface of the nuclear cladding tube by mechanical or chemical polishing;
sputtering the polished nuclear cladding tube with argon ions;
heating the ion-sputtered nuclear fuel rod at 200-300° C. to remove native oxides from the cladding tube surface; and
forming the oxide coating layer on the inner surface of the polished nuclear cladding tube in a vacuum of $1.0\times10^{-8}$-$1.0\times10^{-6}$ torr.

* * * * *